Sept. 29, 1925.
J. NOVAK
HARVESTER
Filed March 29, 1923      3 Sheets-Sheet 3
1,555,695
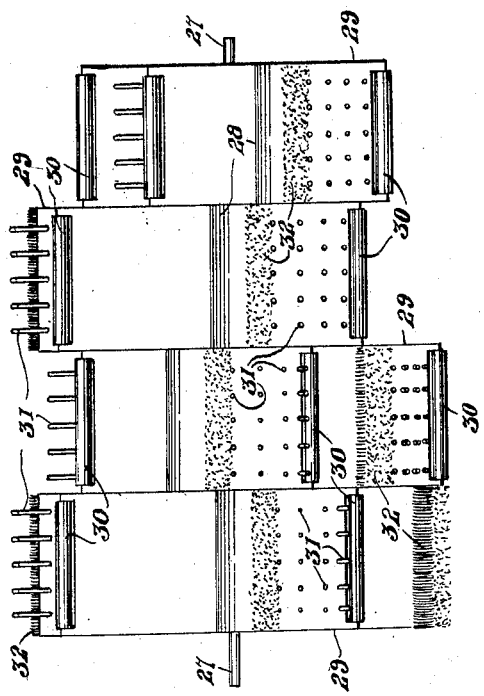
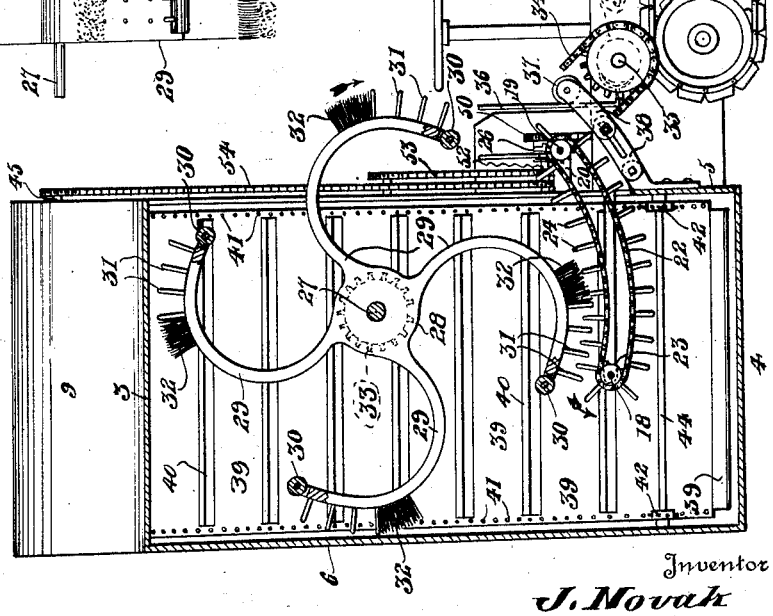
Inventor
J. Novak
By
Attorney Patented Sept. 29, 1925.

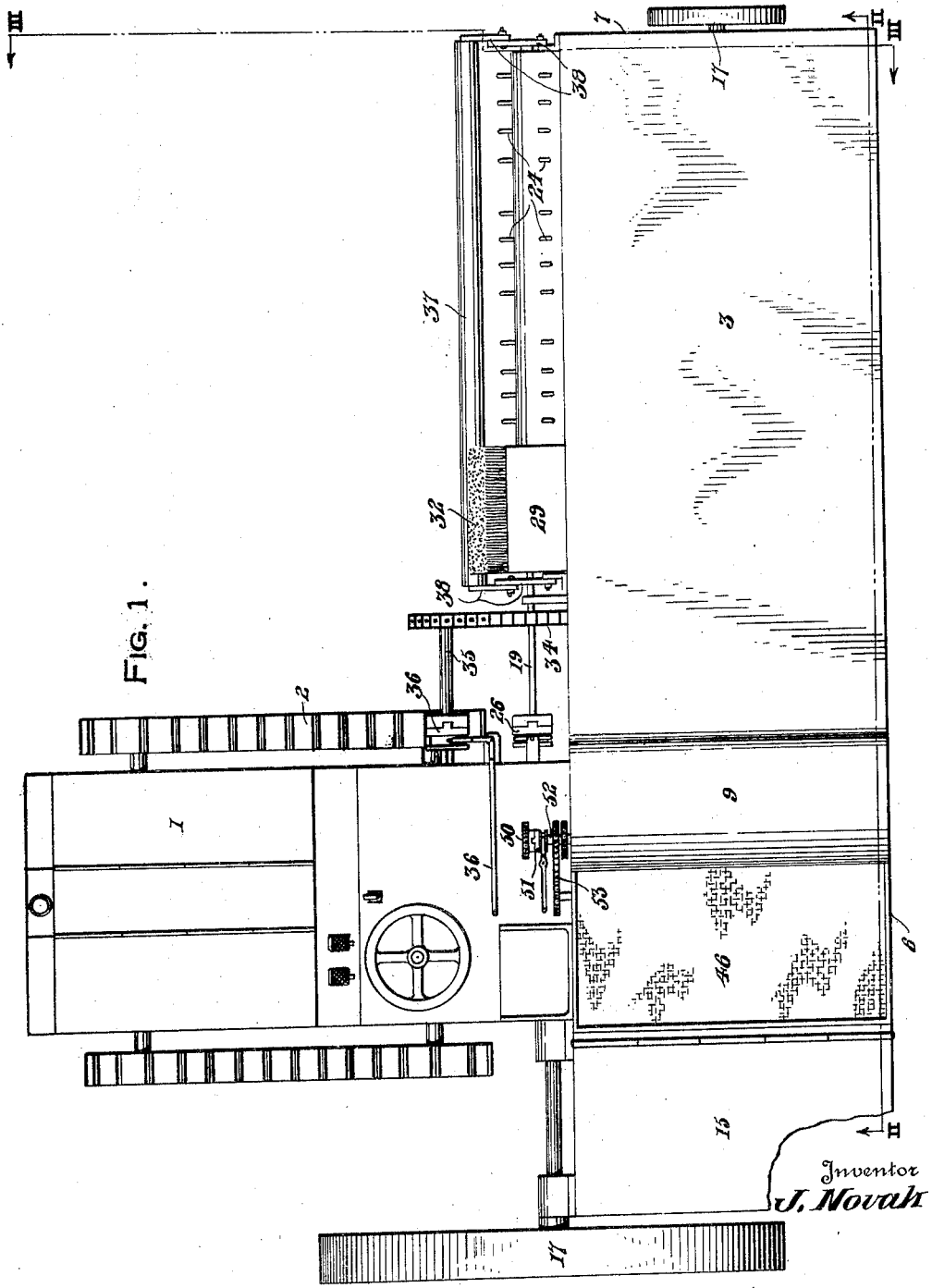

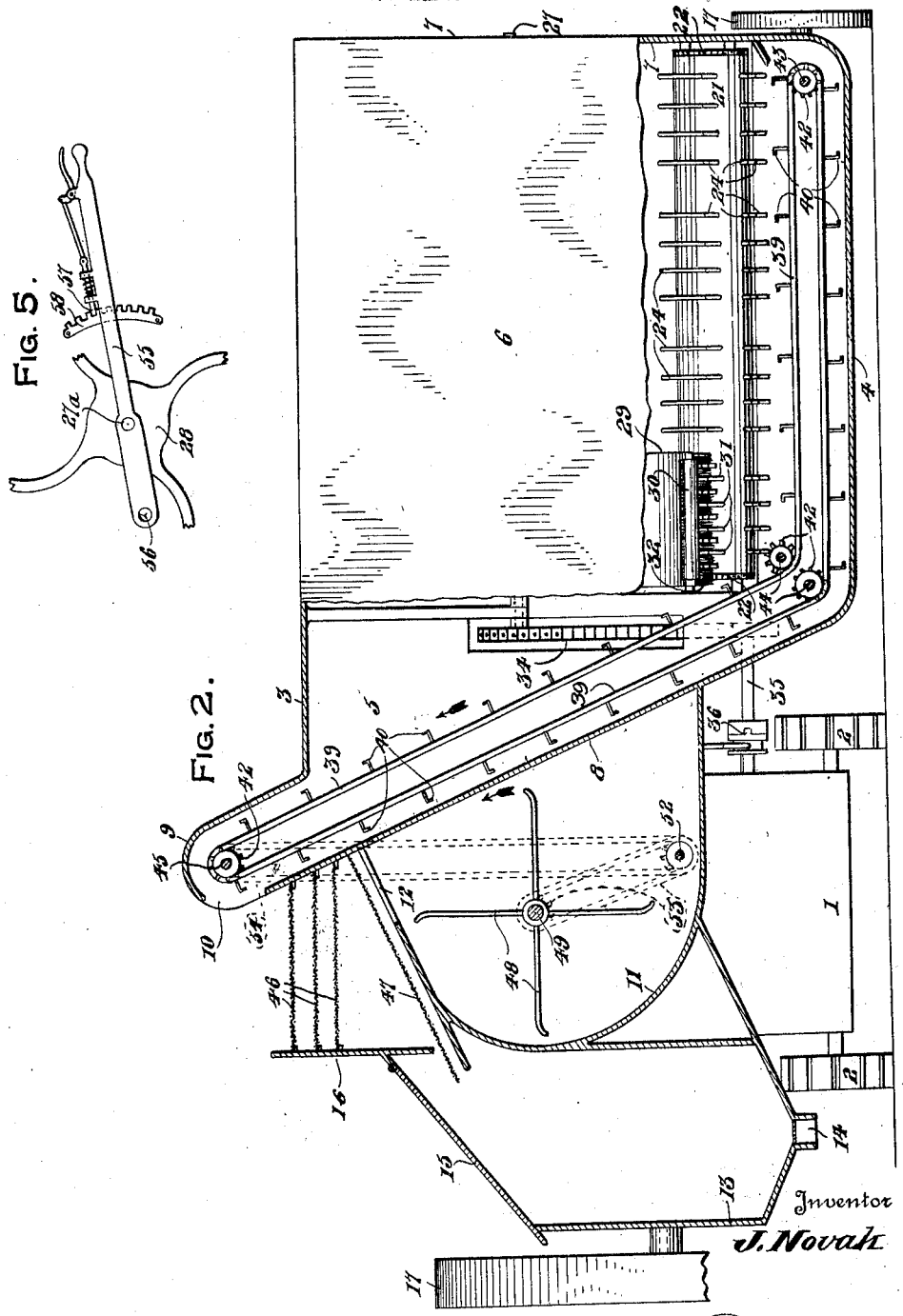

1,555,695

UNITED STATES PATENT OFFICE.

JAMES NOVAK, OF MADISON, OHIO.

HARVESTER.

Application filed March 29, 1923. Serial No. 628,482.

*To all whom it may concern:*

Be it known that I, JAMES NOVAK, a citizen of the United States of America, residing at Madison, in the county of Lake and State of Ohio, have invented certain new and useful Improvements in Harvesters, of which the following is a specification.

This invention relates to certain new and useful improvements in harvesters and has particular reference to a harvesting machine adapted for threshing standing grain while traveling through a field.

The primary object of the invention is to provide a harvesting machine adapted to sever the tops or grain pods of grain stalks while traveling through a field of growing grain with devices for separating the grains from the pod and conveying the separated grains and pods to a series of sifting screens with which a fan blower is associated to separate the chaff from the grain.

Another object of the invention is to provide a traveling harvester and threshing machine wherein the threshing devices for separating the grains from the pods are disposed above a horizontal lower end section of an endless conveyor that carries the grain and chaff to a series of sifting screens with which a fan blower is associated, independently operable clutch control driving devices being associated with each of the movable devices for controlling operation thereof.

The invention embodies other improvements in the art and more particularly with reference to the application filed by James Novak for improvements in harvesters, Patent No. 1,449,869, dated Mar. 27, 1923.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a top plan view of a harvester constructed in accordance with the present invention showing the engine tractor and the rearwardly and laterally positioned harvesting and threshing devices, Figure 2 is a vertical longitudinal sectional view taken on lines II—II of Fig. 1 showing the threshing or grain topping devices and the endless conveyor for delivering the separated grains and pods to the sifting screens and fan blower, Figure 3 is a vertical cross sectional view taken on line III—III of Fig. 1 showing the grain topping or threshing devices and the endless conveyor disposed beneath the same, Figure 4 is a side elevational view of the rotatable grain topping element of the threshing mechanism showing the same formed of similar sections arranged in staggered relation, and Figure 5 is a fragmentary detail view showing a modified form of mounting for the rotatable member of the threshing mechanism.

Referring more in detail to the accompanying drawings, there is illustrated a harvesting machine embodying a tractor engine 1, the supporting wheels of which a provided with endless belt treads 2 as shown in Figs. 1 and 3, the rear end of the tractor engine having attached thereto a harvesting machine including a body portion that extends laterally of the tractor engine as shown in Fig. 1, the harvester body having an upper wall 3, a bottom wall 4 and front and rear walls 5 and 6 respectively. One end of the tractor body is closed by the outer end wall 7, while the inner end of the bottom wall 4 is inclined upwardly as at 8, and extends to a point slightly above the upper wall 3, the adjacent end of the upper wall being inclined upwardly and arched as at 9 with the end thereof slightly spaced from the upper end of the inclined end wall 8 to provide an opening 10 for purposes presently to appear. An arcuate wall 11 is disposed at the outer side of the end wall 8 to provide a fan chamber, the upper end of the wall 11 being provided with an opening 12 as clearly shown in Fig. 2. A grain hopper 13 is disposed outwardly of the arcuate wall 11, the same having a gate controlled discharge spout 14 in the lower tapering end thereof, while the upper end of the grain hopper is provided with a hinged cover 15 attached to the wall 16 of the harvester body, while the latter is supported by ground wheels 17.

The grain topping or threshing mechanism is confined within that portion of the body or casing disposed laterally of the traction engine 1 and includes a pair of shafts 18 and 19, the shaft 18 being journaled within the casing while the shaft 19 is journaled in the bracket 20 disposed forwardly of the front wall 5 as shown in Fig. 3. An endless belt 21 passes over the shafts 18 and 19 and has a sprocket chain 22 associated with each end thereof and passing over sprocket wheels 23 fixed to the shafts 18 and 19. The outer face of the belt 21 carries a plurality of outwardly directed fingers or pins 24 arranged in sets as shown in Fig. 2 for purposes presently to appear. The endless belt 21 is driven through the chain and sprocket mechanism above described communicating with the engine of the tractor 1 and controlled by the clutch mechanism 26 shown in Figs. 1 and 3.

The grain topping and threshing mechanism further includes a series of rotatable members cooperating with the endless belt 21, the shaft 27 journaled longitudinally of the lateral extension of the casing having a series of rotatable members fixed thereon in staggered relation as shown in Fig. 4, each rotatable member including a central disk portion 28 carrying spaced outwardly directed arcuate plate sections or arms 29 that are curved in the same directions as illustrated in Fig. 3, the outer free end of each arm carrying a roller 30, a plurality of pins 31 and a rearwardly positioned brush 32, the arcuate arms 29 moving in proximity to the endless belt 21 for cooperation with the pins 24. The shaft 27 and threshing elements carried thereby are rotated through the medium of the sprocket wheel 33 fixed to the shaft 27 and having the sprocket chain 34 traversing the same and associated with the power shaft 35 as shown in Fig. 2 and controlled by the clutch mechanism 36. A guide roller 37 is journaled in the outer ends of adjustable bracket supports 38 carried by the lower end of the front wall 5 of the casing, the roller 37 being disposed slightly below the shaft 19 and acts as a fulcrum or breaking point for the standing stalks of growing grain when the pods are engaged by the outer ends of the arcuate arms 29.

An endless conveyor 39 is disposed within the casing, the same being provided with a plurality of spaced outwardly directed flights 40, the belt or conveyor 39 having the lower ends thereof traveling in horizontal directions parallel with the bottom wall 4 of the casing, while the upper end travels parallel with the inclined end wall 8 as shown in Fig. 2. The opposite edges of the conveyor belt 39 are provided with a plurality of perforations 41 with which sprocket wheels 42 are associated, a shaft 43 extending transversely of the casing adjacent the end wall 7 supporting a pair of sprocket wheels 42, while spaced shafts 44 adjacent the lower end of the inclined end wall 8 support a pair of sprocket wheels with the conveyor belt 39 traveling beneath the same as illustrated. A shaft 45 journaled in the end extension 9 of the top wall 3 of the casing supports sprocket wheels 42 over which the belt traverses.

A plurality of spaced screens 46 graduated in mesh are disposed at the upper end of the casing between the upper end of the inclined wall 8 and the rear wall section 16 while an inclined screen section 47 is disposed beneath the same and above the opening 12 in the arcuate wall 11. A fan wheel 48 is fixed to the shaft 49 in the compartment between the inclined end wall 8 and arcuate wall 11 and is adapted to force a current of air upwardly through the opening 12 and through the screens 47 and 46. The driving mechanism for the conveyor belt 39 and fan 48 includes a chain and sprocket mechanism 50 driven from the power shaft of the tractor engine 1 and being under control of the clutch 51. The shaft 52 has a chain and sprocket connection 53 with the fan shaft 49, and a chain and sprocket connection 54 with the shaft 45.

If desired, the rotatable members 28 of the threshing devices may be adjusted with respect to the endless belt 21, there being illustrated in Fig. 5 of the drawings, a lever 55 pivotally mounted at one end as at 56 and rotatably supporting the shaft 27ª intermediate the ends of said leather lever, the outer end of the lever 55 carrying a manually releasable tensioned dog 57 that cooperates with the rack segment 58, movement of the lever 55 shifting the members 28 with respect to the belt 21.

In the operation of the device, the machine is driven through a field of standing grain by the tractor engine, the roller 34 upon the adjustable bracket arms 38 being disposed for contacting the stalks of the grain at points spaced below the pods. Rotation of the members 28 fixed to the shaft 27 will cause the pins and brush elements 31 and 32 carried by the outer faces thereof to contact the grain pods and move the same over the traveling endless belt 21, the stalks breaking in being bent over the guide roller 37, while the grain is removed from the pods when being drawn through or between the arcuate arms 29 and the endless belt 21. The separated grains and pods or chaff are delivered upon the conveyor belt 39 and are delivered by the flights 40 to the opening 10 at the upper end of the body casing for discharge upon the sifting screens 46. The fan 48 forcing a current of air through the opening 12 and screens, will separate the chaff from the grain and cause the grain to descend into the hopper or receptacle 13.

While there are herein shown and described the preferred embodiments of the present invention, it is nevertheless to be understood that minor changes may be made therein without departing from the spirit and scope of the invention as claimed.

What is claimed as new is:—

1. In a threshing machine of the type described, wherein an endless conveyor delivers threshed grain to a receptacle, severing and delivering means for the grain while the latter is standing including circularly moving arms and an endless traveling belt associated with the endless conveyor with the belt located directly under the arms, a journaled hub carrying the arms, a lever pivoted at one end on the body and supporting the hub journal intermediate the ends of the lever for vertically shifting the hub and arms relative to the endless belt, outwardly directed pins carried by the arms and belt, means for rotating the arms and moving the belt, said arms being arranged in staggered relation longitudinally of the hub a grain stalk engaging roller positioned forwardly of the forward end of the endless traveling belt and adjustable brackets supporting the roller.

2. In a threshing machine of the type described, wherein an endless conveyor delivers threshed grain to a receptacle, severing and delivering means for the grain while the latter is standing including circularly moving arms and an endless traveling belt associated with the endless conveyor with the belt located directly under the arms, a journaled hub carrying the arms, a lever pivoted at one end on the body and supporting the hub journal intermediate the ends of the lever for vertically shifting the hub and arms relative to the endless belt, outwardly directed pins carried by the arms and belt, means for rotating the arms and moving the belt, said arms being arranged in staggered relation longitudinally of the hub a grain stalk engaging roller positioned forwardly of the forward end of the endless traveling belt, adjustable brackets supporting the roller the arms being of curved formation and the endless traveling belt being of a length relative to the supports therefor disposed to provide a slack in the belt with the upper section of the belt assuming a curvature corresponding to the curved arms.

In testimony whereof I affix my signature.

JAMES NOVAK.